July 17, 1951  C. W. BROWN  2,560,925
ADJUSTABLE HEAD REST
Filed April 24, 1950
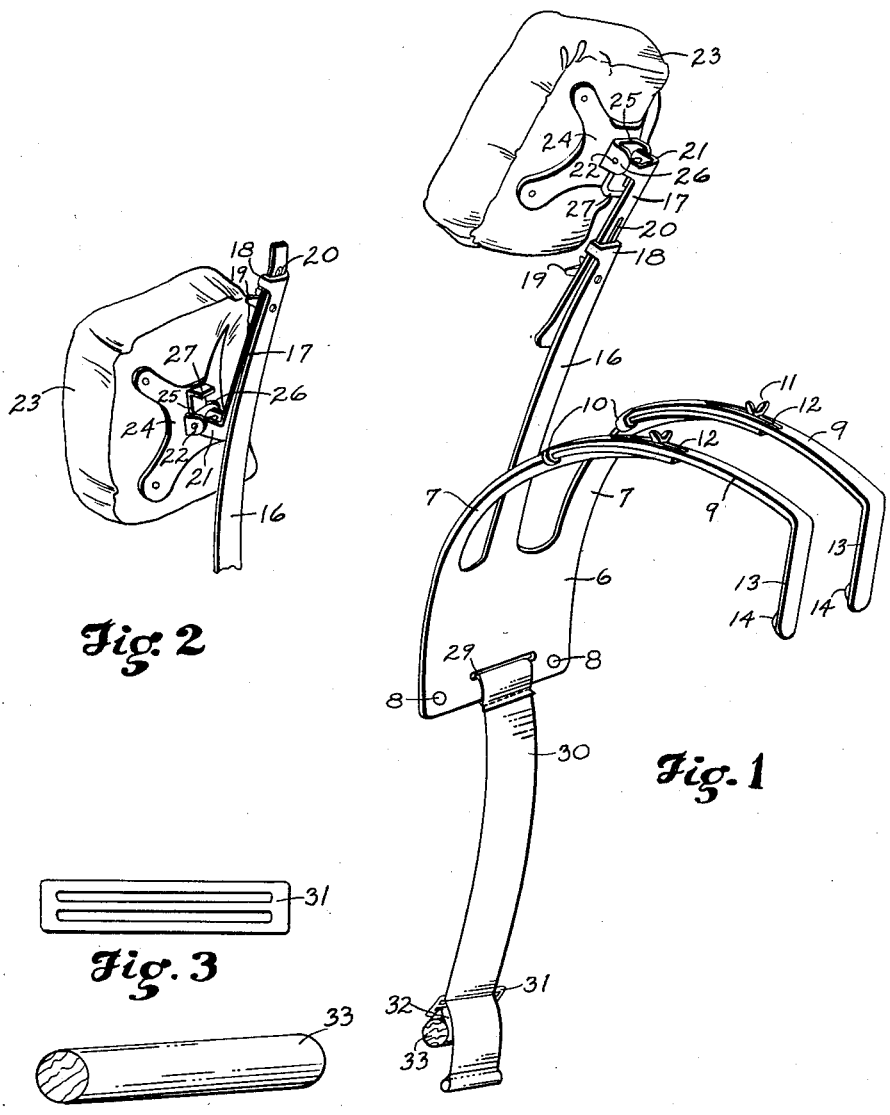
INVENTOR.
Clayton W. Brown
BY
Stedman B. Hoar
Agent Patented July 17, 1951

2,560,925

UNITED STATES PATENT OFFICE 2,560,925

ADJUSTABLE HEAD REST

Clayton W. Brown, Olive, Calif.

Application April 24, 1950, Serial No. 157,837

3 Claims. (Cl. 155—177)

This invention relates to a head-rest for use in a vehicle such as an automobile, airplane, or railroad car, and has as an object the provision of a head-rest which may be easily attached to the backs of vehicular seats of different types and sizes which may be adjusted to the requirements of persons of different heights, and may serve also as a back-rest for those desiring to maintain in comfort a more forward position in a seat.

It is a further object of the invention to provide a head-rest, or as above stated alternatively a back-rest, in which are combined the comfort-producing features of a soft pad, a spring suspension for the pad, and a pivot mounting for the pad upon the spring suspension which allows the pad to swing and to support the head or back of the seat's occupant with the maximum of surface area.

The invention possesses other useful features and advantages which will be pointed out as the following description of a preferred embodiment of the invention proceeds, or will be apparent from the description considered in connection with the accompanying drawing illustrative of that embodiment, in which:

Fig. 1 is a perspective view from a rearward view-point of a head-rest according to my invention;

Fig. 2 is a fragmentary perspective view showing the device adjusted to serve as a back-rest, or as a head-rest for a short person or child; and Figs. 3 and 4 are enlarged details of the means by which the head-rest is anchored to maintain it upright.

Having reference now to the details of the drawing, I have shown a plate or bracket 6 adapted to lie against the upholstery of the forward side of the back of a vehicle seat and to be supported from the top of the seat back by rearwardly curving arms 7. The plate 6 may be of any suitable material, for example, chromium-plated pressed steel of some springiness, and may be provided on its rearward surface with buttons 8, of rubber, felt or like material, which will receive the major rearward pressure upon the plate and will prevent the edges of the plate from marring the upholstery. Hooks 9 are slidably and extensibly secured to the arms 7 by clip-fingers 10 and by wing-bolts 11 threaded in the ends of the arms 7 and slidable in slots 12 in the hooks, so as to be capable of extending across the tops of seat-backs of different thicknesses and to bring hook-ends 13 into clamping engagement with the rearward side of the seat back. The hook-ends 13 may be provided with buttons or pads 14, like the buttons 8, to prevent marring the rearward surface of the seat back.

An arm 16 extends upwardly from the plate 6 between the arms 7 and is preferably integral with the plate if the latter is of spring steel, otherwise it may be made of spring material and suitably attached to the plate. An extension arm 17 is slidably gripped by clip-fingers 18 on the upper end of the spring arm 16 and is held at selected extension and in alignment with the spring arm by a wing-bolt 19 threaded in the spring arm and slidable in a slot 20 in the extension arm. At one end of the extension arm 17 are forwardly extending fingers 21 which journal a hinge pin 22. A pad 23 is suitably attached to a spider plate 24 which in turn carries a hinge plate 25 having lugs 26 perforated to receive the ends of the hinge pin 22. A third lug 27 extends rearwardly from the hinge plate 25 to make contact with the extension arm 17 and thereby limit the pivotal movement of the pad 23 in a manner and for a purpose hereinafter explained.

The lower margin of the plate 6 has a slot 29 through which is looped the end of a strap 30. The strap 30 passes and repasses through a slip buckle 31 forming a bight 32 in which may be placed a dowel 33. Obviously, the distance between the dowel 33 and the plate 6 may be adjusted by sliding the strap 30 through the buckle 31.

To utilize the device of my invention as a head-rest for a normally tall person, the plate 6 is placed against the forward side of the vehicular seat back with the curved arms 9 extending over the seat top and the arm 16 extending upwardly. The hooks 9 are adjusted to grip the seat back and are clamped in suitable extension by tightening the wing bolts 11. The strap 30 is adjusted in length to permit the dowel 33 to be pushed between the upholstery of the seat and of the seat back where it will be retained by the resilient upholstery to anchor the head-rest, holding the arms 7 and hooks 9 down against the top of the seat back and preventing the arm 16 from swinging from an upright position. The slotted end of the extension arm 17 is engaged between the clip fingers 18 from above, with the pad 23 faced forwardly, and the pad is adjusted and secured at a comfortable height by manipulation of the wing-bolt 19. The pad 23 may, under pressure of a person's head, tilt rearwardly as much as the person may desire, but will be restrained by the lug 27 from tilting forwardly beyond a position in which the face of the pad is substantially parallel to the face of the upholstery of the seat back, thus being kept out of contact with the wing bolt 19.

To adjust the device as a head-rest for a short person or as a back-rest, the wing-bolt 19 is temporarily removed and the slotted end of the extension arm 17 is engaged between the clip fingers 18 from below, with the pad 23 in the downwardly extended position shown in Fig. 2. In this position, the pad still has considerable hinged movement and will pivot in response to body pressure or head pressure between a forward tilting position in which the lower edge of the pad rests against the arm 16, and a rearwardly tilting position in which the lug 27 again prevents the pad from being scored by the wing bolt 19. The extension arm is secured in the downwardly extended position by reapplication of the wing bolt 19. If the pad is thus adjusted to about the height of the shoulder-blades of the driver of the automobile, it will be found to be very restful for driving in the night or in stormy weather, when many drivers have a tendency to lean forward to obtain better vision, and assume a crouching posture which may become very tiresome.

As the hooks 9 and the extension arm 17 may be disengaged respectively from the arms 7 and 16, the device may be disassembled for packing in a relatively small container.

I wish it understood that modifications may be made in the form and arrangement of the device as exemplified in the drawing without departure from the spirit and scope of the invention as defined in the appended claims.

I claim:

1. In a head-rest for use with a vehicle seat, the combination of: a support bracket; hooks on said bracket for supporting said bracket upon the back of said seat; an arm integral with said bracket and extending upwardly therefrom; means for anchoring said bracket so as to hold said arm upright; an extension arm adjustably secured to said first arm to vary the degree of extension and reversible so as to be extensible in either vertical direction; a pivot mounting extending forwardly from one end of said extension arm; and a pad mounted on said pivot mounting.

2. In a head-rest for use with a vehicle seat, the combination of: a support bracket; hooks on said bracket for supporting said bracket upon the back of said seat, said hooks being extensible and including means for clamping said hooks on seat-backs of different thicknesses; an arm integral with said bracket and extending upwardly therefrom; an extension arm adjustably secured to said first arm to vary the degree of extension and reversible so as to be extensible in either vertical direction; a pivot mounting extending forwardly from one end of said extension arm; and a pad mounted on said pivot mounting.

3. In a head-rest for use with a vehicle seat the combination of: hooks adapted to extend over the back of said seat; a plate supported by said hooks and adapted to rest against the front of said seat back; a spring arm extending upwardly from said plate; a pad; and an extension arm to one end of which said pad is secured, adapted to be secured to said spring arm so as to hold said pad upwardly as a head rest or downwardly as a back-rest.

CLAYTON W. BROWN.

REFERENCES CITED

The following references are of record in the file of this patent:

UNITED STATES PATENTS

| Number | Name | Date |
|---|---|---|
| 792,669 | Schaff | June 20, 1905 |
| 856,025 | Brown | June 4, 1907 |
| 2,056,479 | Newman | Oct. 6, 1936 |